US012592753B2

(12) United States Patent
Huang

(10) Patent No.: US 12,592,753 B2
(45) Date of Patent: Mar. 31, 2026

(54) METHOD AND APPARATUS FOR HYBRID BEAMFORMING WITH AUTONOMOUS BEAMFORMERS IN MOBILE COMMUNICATIONS

(71) Applicant: MEDIATEK INC., Hsin-Chu (TW)

(72) Inventor: Chien-Hwa Huang, Hsin-Chu (TW)

(73) Assignee: MediaTek Inc., Hsinchu City (TW)

( * ) Notice: Subject to any disclaimer, the term of this patent is extended or adjusted under 35 U.S.C. 154(b) by 424 days.

(21) Appl. No.: 17/978,921

(22) Filed: Nov. 1, 2022

(65) Prior Publication Data

US 2023/0170959 A1     Jun. 1, 2023

Related U.S. Application Data

(60) Provisional application No. 63/284,696, filed on Dec. 1, 2021.

(51) Int. Cl.
| | |
|---|---|
| *H04B 7/06* | (2006.01) |
| *H04B 7/01* | (2006.01) |
| *H04L 5/00* | (2006.01) |

(52) U.S. Cl.
CPC ............. *H04B 7/0617* (2013.01); *H04B 7/01* (2013.01); *H04L 5/0051* (2013.01)

(58) Field of Classification Search
CPC ........ H04B 7/01; H04B 7/0617; H04L 5/0051
See application file for complete search history.

(56) References Cited

U.S. PATENT DOCUMENTS

| | | |
|---|---|---|
| 2018/0351619 A1 | 12/2018 | Khan |
| 2019/0222296 A1* | 7/2019 | Khandani .............. H04B 7/086 |
| 2021/0050893 A1* | 2/2021 | Park ...................... H04L 5/0048 |
| 2021/0067118 A1* | 3/2021 | Patel .................. H01Q 21/0025 |

OTHER PUBLICATIONS

Taiwan IP Office, search report for application 111145859, mailed on May 26, 2023 (3 pages). No English translation is readily available.
China Patent Office, Office Action For application 202211494004.0, Dated Oct. 12, 2025 (No English Translation Available).

* cited by examiner

*Primary Examiner* — Brian P Cox
(74) *Attorney, Agent, or Firm* — Helen Mao; Zheng Jin; Imperium Patent Works

(57) ABSTRACT

Method and apparatus are provided for hybrid beamforming with autonomous beamformers in mobile communications. An apparatus can receive a plurality of input signals from a network node by a plurality of antennas. The apparatus can perform autonomous beamforming by adjusting phases of the plurality of input signals to generate autonomous beamformed signals. The apparatus can perform at least one of digital beamforming and analog beamforming on the autonomous beamformed signals based on a reference signal from the network node to generate a beamformed signal.

18 Claims, 6 Drawing Sheets

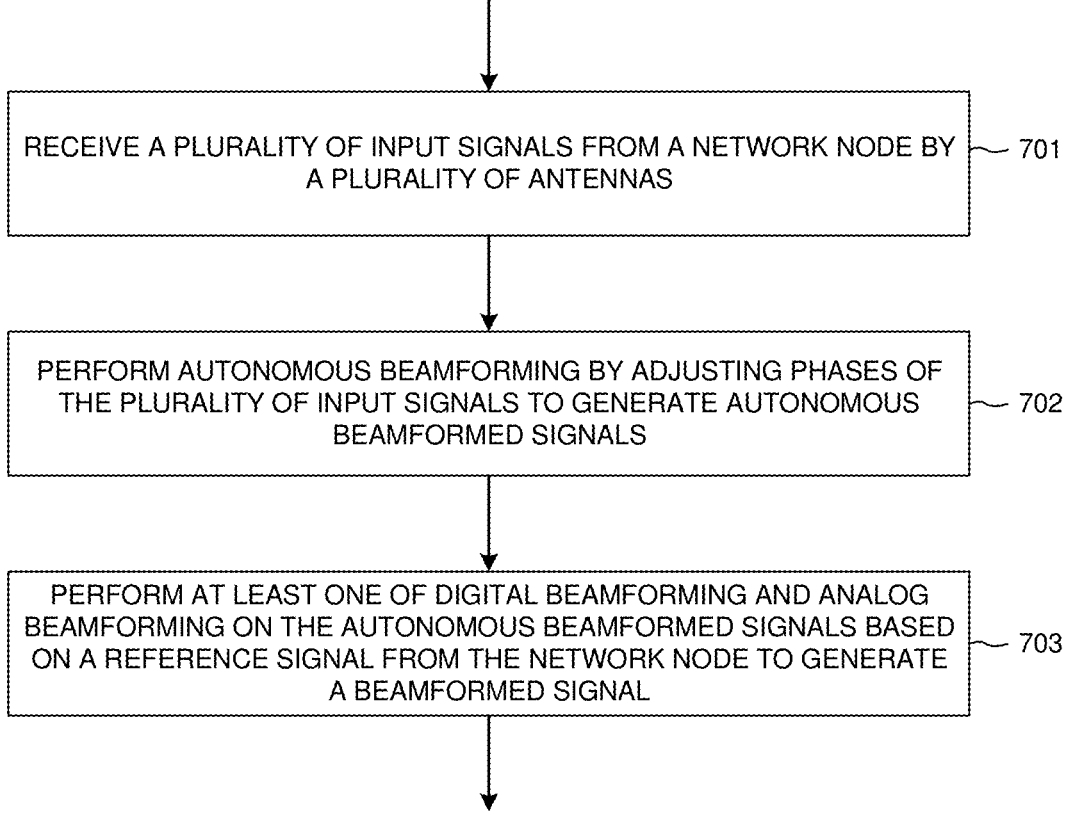

RECEIVE A PLURALITY OF INPUT SIGNALS FROM A NETWORK NODE BY A PLURALITY OF ANTENNAS — 701

PERFORM AUTONOMOUS BEAMFORMING BY ADJUSTING PHASES OF THE PLURALITY OF INPUT SIGNALS TO GENERATE AUTONOMOUS BEAMFORMED SIGNALS — 702

PERFORM AT LEAST ONE OF DIGITAL BEAMFORMING AND ANALOG BEAMFORMING ON THE AUTONOMOUS BEAMFORMED SIGNALS BASED ON A REFERENCE SIGNAL FROM THE NETWORK NODE TO GENERATE A BEAMFORMED SIGNAL — 703

FIG. 7

METHOD AND APPARATUS FOR HYBRID BEAMFORMING WITH AUTONOMOUS BEAMFORMERS IN MOBILE COMMUNICATIONS

CROSS REFERENCE TO RELATED APPLICATIONS

This application claims priority under 35 U.S.C. § 119 from U.S. Provisional Application No. 63/284,696, entitled "Hybrid Beamforming with Autonomous Beamformers," filed on Dec. 1, 2021, the subject matter of which is incorporated herein by reference.

TECHNICAL FIELD

The disclosed embodiments relate generally to wireless communication, and, more particularly, to method and apparatus for hybrid beamforming with autonomous beamformers in mobile communications.

BACKGROUND

In conventional wireless communication systems with Multiple-Input Multiple-Output (MIMO) technology such as 3rd generation partnership project (3GPP) 5G new radio (NR), multiple input signals are received by multiple antennas of a receiver. The received input signals may have different phases since the propagation paths/channels of the input signals are different. Therefore, there should be some beamforming schemes at the receiver side for processing and combining the signals. The receiver needs to adjust/align the phases of the input signals so that these input signals will not interfere with each other.

In a conventional receiver (e.g., a user equipment), the beamforming (e.g., adjusting phases) is performed according to a reference signal from a network node. The receiver needs to rely on the reference signal for determining the phase difference for each input signal. However, such demands on reference signals will cause huge signaling overheads on the network side. The network node needs to transmit/broadcast a lot of reference signals for beamforming purpose at the receiver. These reference signals will occupy significant radio resources and burden signaling overheads on the communication system.

Therefore, how to reduce reference signal overheads and improve radio efficiency becomes an important issue in a newly developed communication system (e.g., 6G). Thus, there is a need to provide proper schemes to perform beamforming with less reference signals.

SUMMARY

Method and apparatus are provided for hybrid beamforming with autonomous beamformers in mobile communications. In particular, an apparatus can receive a plurality of input signals from a network node by a plurality of antennas. The apparatus can perform autonomous beamforming by adjusting phases of the plurality of input signals to generate autonomous beamformed signals. The apparatus can perform at least one of digital beamforming and analog beamforming on the autonomous beamformed signals based on a reference signal from the network node to generate a beamformed signal. Accordingly, the apparatus can perform beamforming with a less number of reference signals from the network node.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 is a flow chart of a method of hybrid beamforming with autonomous beamformers in accordance with embodiments of the present disclosure.

DETAILED DESCRIPTION

Reference will now be made in detail to some embodiments of the invention, examples of which are illustrated in the accompanying drawings.

Figure 1:
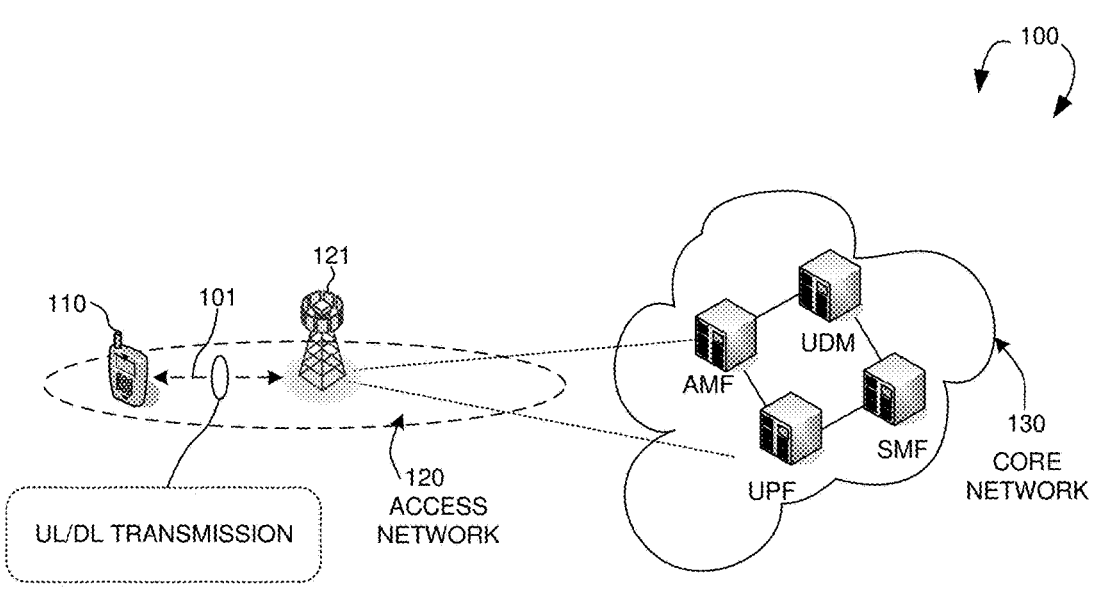
FIG. 1 illustrates an exemplary wireless communication network supporting hybrid beamforming with autonomous beamformer in accordance with embodiments of the present disclosure.

FIG. 1 illustrates an exemplary wireless communication network 100 (e.g., 6G network) supporting hybrid beamforming with autonomous beamformer in accordance with aspects of the current invention. The 6G network 100 includes a user equipment (UE) 110 communicatively connected to a base station (BS) 121 operating in a licensed band (e.g., 30 GHz~300 GHz) of an access network 120 which provides radio access using a Radio Access Technology (RAT). The access network 120 is connected to a core network 130 by means of the NG interface, more specifically to a User Plane Function (UPF) by means of the NG user-plane part (NG-u), and to a Mobility Management Function (AMF) by means of the NG control-plane part (NG-c). One base station can be connected to multiple UPFs/AMFs for the purpose of load sharing and redundancy. The UE 110 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

The BS 121 may provide communication coverage for a geographic coverage area in which communications with the UE 110 is supported via a communication link 101. The communication link 101 shown in the 6G network 100 may include UL transmissions from the UE 110 to the BS 121 (e.g., on the Physical Uplink Control Channel (PUCCH) or Physical Uplink Shared Channel (PUSCH)) or downlink (DL) transmissions from the BS 121 to the UE 110 (e.g., on the Physical Downlink Control Channel (PDCCH) or Physical Downlink Shared Channel (PDSCH)).

Figure 2:
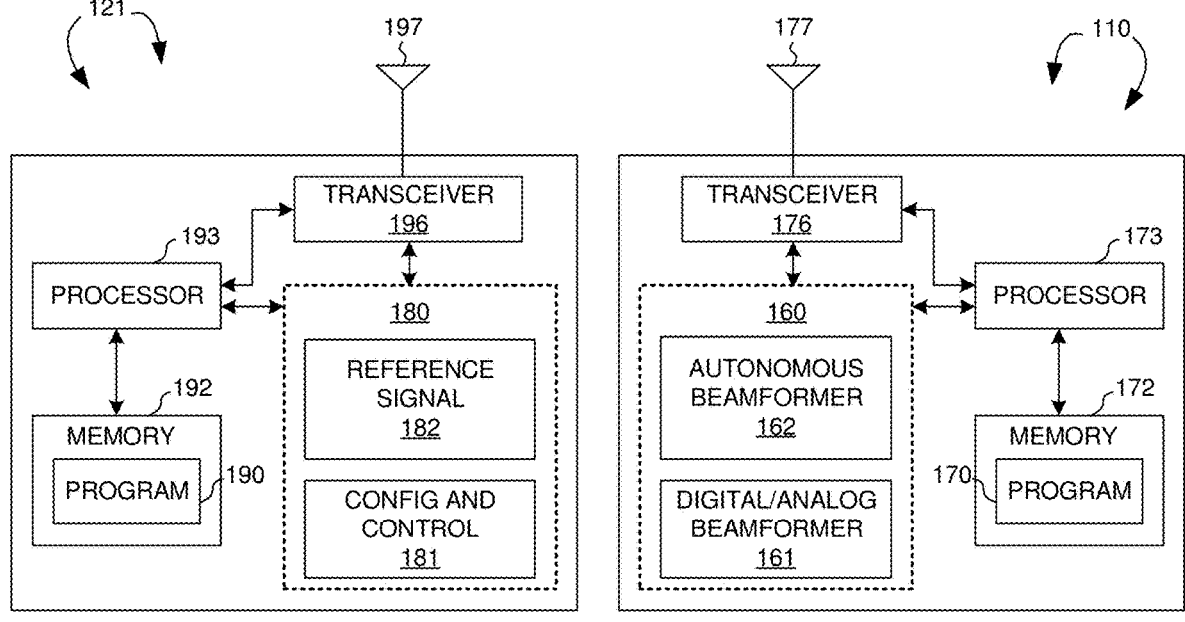
FIG. 2 is a simplified block diagram of the BS and the UE in accordance with embodiments of the present disclosure.

FIG. 2 is a simplified block diagram of the BS 121 and the UE 110 in accordance with embodiments of the present invention. For the BS 121, an antenna 197 transmits and receives radio signal. The antenna 197 may comprise a plurality of antennas/sub-antennas. A radio frequency (RF) transceiver module 196, coupled with the antenna 197, receives RF signals from the antenna 197, converts them to baseband signals and sends them to processor 193. RF transceiver 196 also converts received baseband signals from the processor 193, converts them to RF signals, and sends out to antenna 197. Transceiver 196 and antenna 197 may constitute an antenna array. Processor 193 processes the received baseband signals and invokes different functional modules and circuits to perform features in the BS 121. Memory 192 stores program instructions and data 190 to control the operations of the BS 121.

Similarly, for the UE 110, antenna 177 transmits and receives RF signals. The antenna 177 may comprise a plurality of antennas/sub-antennas. RF transceiver module 176, coupled with the antenna 177, receives RF signals from the antenna 177, converts them to baseband signals and sends them to processor 173. The RF transceiver 176 also converts received baseband signals from the processor 173, converts them to RF signals, and sends out to antenna 177. Transceiver 176 and antenna 177 may constitute an antenna array. Processor 173 processes the received baseband signals and invokes different functional modules and circuits to perform features in the UE 110. Memory 172 stores program instructions and data 170 to control the operations of the UE 110.

The BS 121 and the UE 110 also include several functional modules and circuits that can be implemented and configured to perform embodiments of the present invention. In the example of FIG. 2, the BS 121 includes a set of control functional modules and circuit 180. Reference signal circuit 182 generates and handles reference signals. Configuration and control circuit 181 provides different parameters to configure and control the UE 110. The UE 110 includes a set of beamforming modules and circuit 160. Autonomous beamformer circuit 162 performs autonomous beamforming. Digital/analog beamformer circuit 161 performs digital beamforming/analog beamforming according to reference signals from the BS 121.

Note that the different functional modules and circuits can be implemented and configured by software, firmware, hardware, and any combination thereof. The function modules and circuits, when executed by the processors 193 and 173 (e.g., via executing program codes 190 and 170), allow the BS 121 and the UE 110 to perform embodiments of the present invention.

Figure 3:
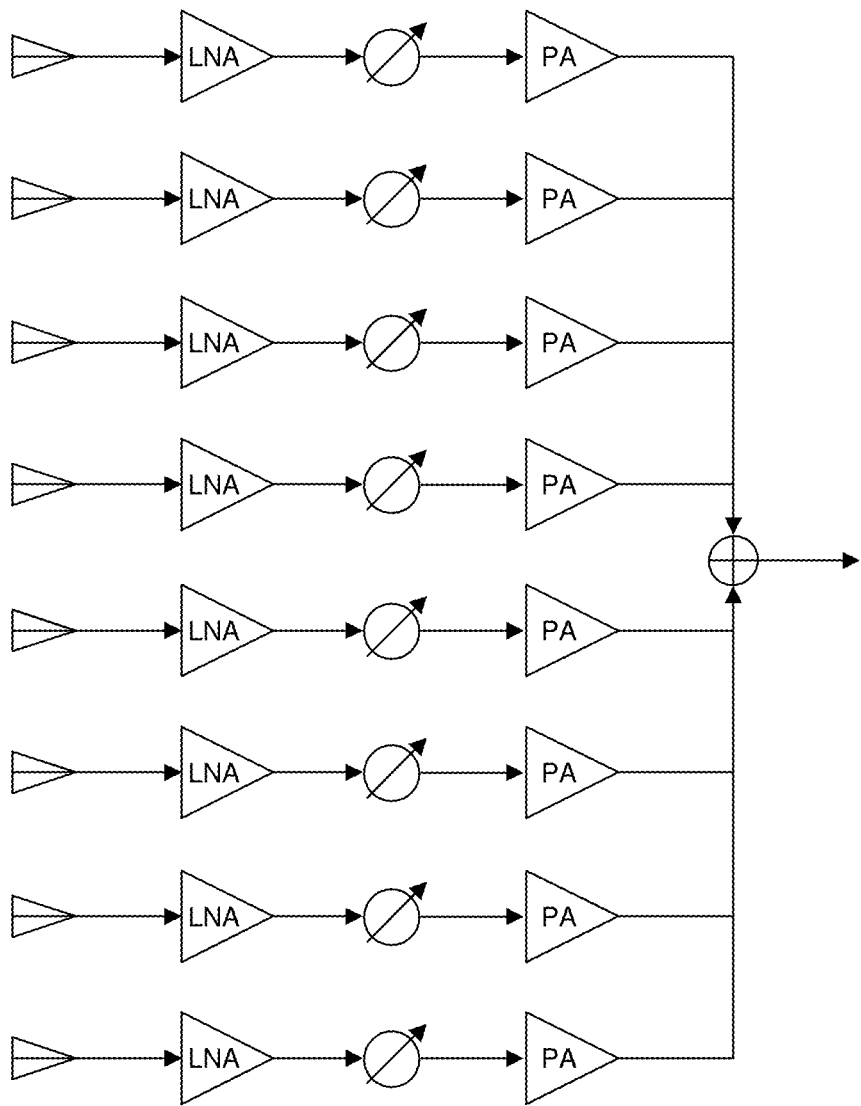
FIG. 3 illustrates one embodiment of conventional receiver in accordance with embodiments of the present disclosure.

FIG. 3 illustrates one embodiment of conventional receiver in accordance with embodiments of the present disclosure. The receiver 300 comprises an eight-element receive antenna array. The antenna array comprises eight antennas for receiving input signals. Each antenna is electrically coupled to a low noise amplifier (LNA) for amplifying the input signal. Each LNA is electrically coupled to a phase shifter for adjusting the phase of the input signal. Each phase shifter is electrically coupled to a power amplifier (PA) for amplifying the amplitude of the input signal. The eight PAs are electrically coupled to an adder/signal combiner for combining the eight input signals and generating a beamformed signal.

The receiver 300 uses analog beamformers to perform analog beamforming. Specifically, the analog beamformers are implemented by the phase shifters. The phase shifters may be configured to perform analog beamforming by adjusting the phases of the input signals according to the reference signal form the network node. For example, the eight input signals received by the antennas may have phase drifts/differences with respect to each other due to different propagation paths/delays. The receiver 300 may further receive a reference signal from the network node. Then, the phase shifters may reply on the reference signal to determine the phase differences among the eight input signals. The phase shifters may be configured to adjust the phase of each input signal to eliminate the phase drifts/differences among each input signal. Thus, after the analog beamforming, the phases of the eight input signals will be aligned/the same. There will be no/zero phase difference between the eight beamformed input signals. Accordingly, all the eight input signals may be constructive combined by the adder/signal combiner and there will be no interference among the eight input signals.

However, in the receiver 300, the analog beamforming needs to be performed based on the reference signals received from the network node. The receiver 300 needs a sufficient number of orthogonal frequency division multiplexing (OFDM) symbols with the reference signals to determine the phase shifts/differences in the antenna array. This will cause significant signaling overhead for the network node. Also, a significant number of radio resources will be occupied/used by the reference signals.

Figure 4:
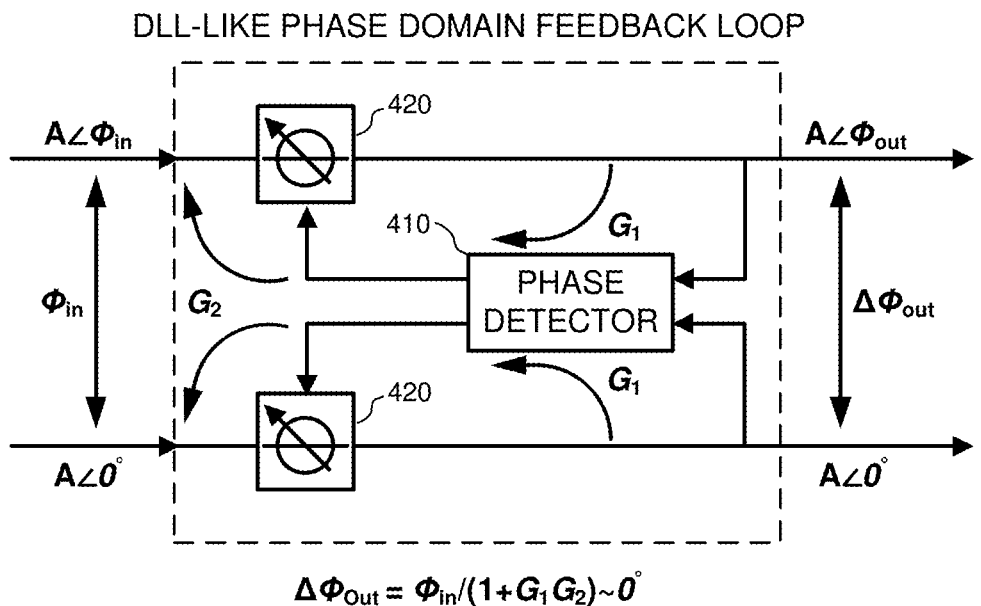
FIG. 4 illustrates one embodiment of one embodiment of autonomous beamformer in accordance with embodiments of the present disclosure.

FIG. 4 illustrates one embodiment of autonomous beamformer in accordance with embodiments of the present disclosure. The autonomous beamformer 400 may comprise two paths to receive two input signals. The two input signals will be passed to the phase detector 410. The phase detector 410 may be configured to detect the phase difference between the two input signals. The autonomous beamformer 400 may also comprise phase-to-voltage converters for transiting the phase difference to the voltage control signal and voltage-to-phase converters for transiting the voltage control signal to the phase adjustment signal. The autonomous beamformer 400 may further comprises the phase shifters 420 for adjusting the phases of the input signals according to the voltage control signals.

The operation principles of autonomous beamformer 400 are illustrated in FIG. 4. When the incoming signals (e.g., input signals) are received by the receiver with an incident angle $\theta$, the received signals at the two adjacent antenna elements have phase difference $\phi_{in}=\pi \sin \theta$ when they are separated by a distance of $\lambda/2$, where $\lambda$ is the wavelength. The phase difference is detected by the phase detector and the direct current (DC) control voltage will be generated according to the phase difference. This forms the phase-to-voltage conversion gain $G_1$. The DC control voltages are then fed back as the control voltages for the phase shifter with voltage-to-phase conversion gain $G_2$. This forms a negative-feedback closed-loop operation in the phase domain with a wideband nature and an overall loop gain of $G_1 G_2$. The output residual phase difference $\phi_{out}$ can be expressed as $\phi_{out}=\pi \sin \theta/(1+G_1 G_2)$. After performing the autonomous beamforming, the output residual phase difference can be reduced to almost zero degree (e.g., $\phi_{out}=\pi \sin \theta/(1+G_1 G_2)\sim0°$).

With the autonomous beamformer, the phase differences between multiple input signals may be eliminated by detecting the phase differences at the receiver side without using the reference signals from the network node. However, the autonomous beamformer cannot distinguish the interference signals from the data signals. Although the autonomous beamformer can align the phase differences among the input signals, it cannot exclude the interference signals. Both the interference signals and the data signals will be processed and amplified. In a case that only autonomous beamformers are used in the receiver, the performance/signal quality of the output signals will be very bad since the interference signal and the data signal are mixed and combined. Thus, the base band processor after the autonomous beamformer will have difficulty to process (e.g., decode) such signals. Therefore, how to use the autonomous beamformer to reduce the demands on the reference signals and avoid poor data performance/quality caused by the autonomous beamformer is worthwhile to develop.

Specifically, an apparatus (e.g., a receiver) may be configured to receive a plurality of input signals from a network node by a plurality of antennas. The apparatus may perform autonomous beamforming by adjusting phases of the plurality of input signals to generate autonomous beamformed signals. Then, the apparatus may perform at least one of digital beamforming and analog beamforming on the autonomous beamformed signals based on a reference signal from the network node to generate a beamformed signal.

In the autonomous beamforming, the apparatus may detect a phase difference between the plurality of input signals and compensate the phase difference. For example, the apparatus may adjust a first phase of a first input signal (e.g., increase/decrease the first phase by half of the phase difference) and adjust a second phase of a second input signal (e.g., decrease/increase the second phase by half of the phase difference). The phase difference between the first phase and the second phase may close or equal to zero after the compensating. The first input signal and the second input signal are constructively combined after the autonomous beamforming. The autonomous beamforming is performed according to the plurality of input signals without using the reference signal from the network node. The autonomous beamforming is performed on each pair of the plurality of input signals.

In the digital beamforming, the apparatus may adjust phases and/or amplitudes of the autonomous beamformed signals according to the reference signal from the network node. In the analog beamforming, the apparatus may adjust phases of the autonomous beamformed signals according to the reference signal from the network node.

In one implementation, at least one of the digital beamforming and the analog beamforming is performed after the autonomous beamforming. In one implementation, the autonomous beamforming is performed on each pair of the plurality of input signals. In one implementation, at least one of the digital beamforming and the analog beamforming is performed on at least two of the autonomous beamformed signals.

Figure 5:
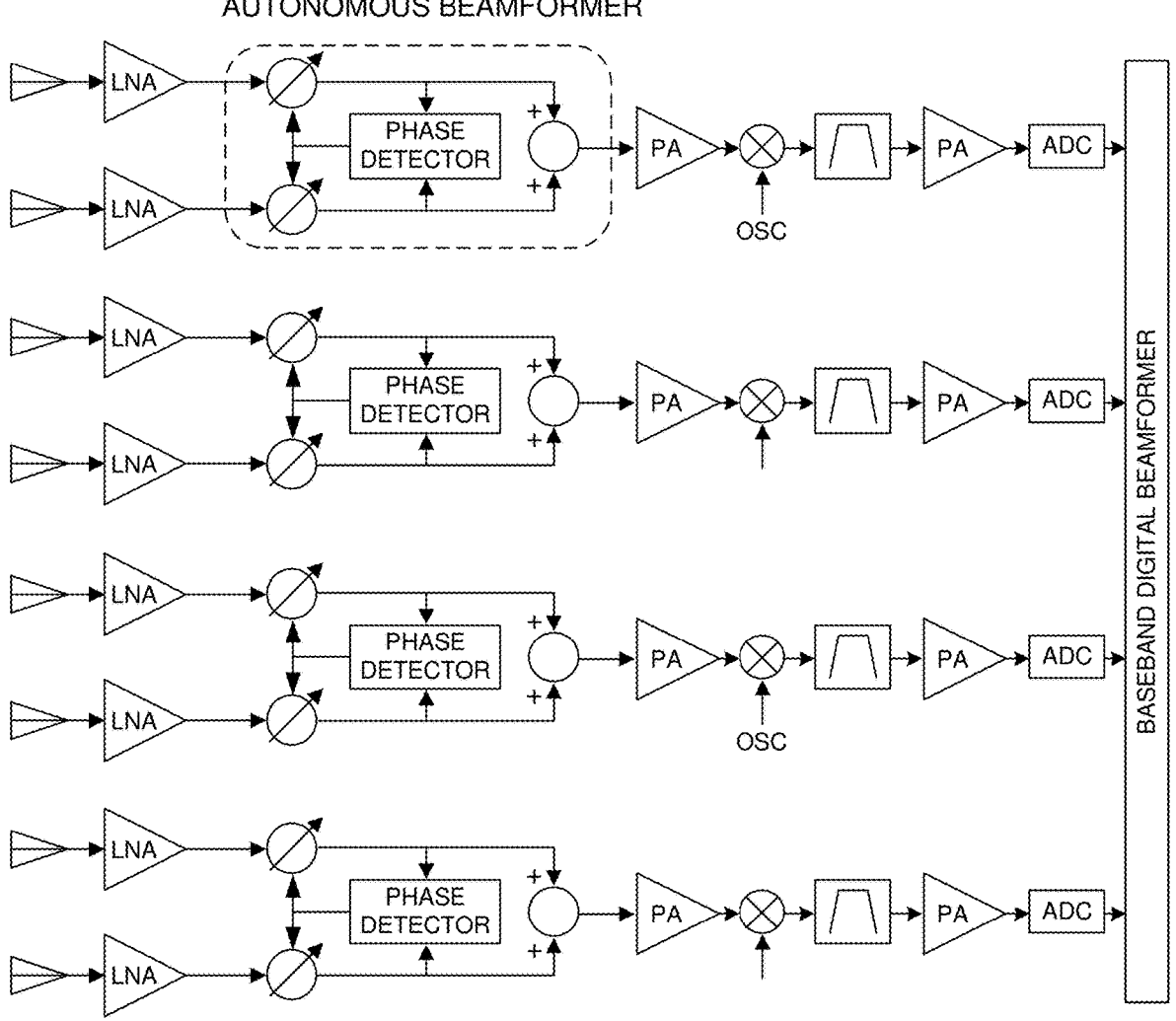
FIG. 5 illustrates one embodiment of hybrid beamforming with autonomous beamformers in accordance with embodiments of the present disclosure.

FIG. 5 illustrates one embodiment of hybrid beamforming with autonomous beamformers in accordance with embodiments of the present disclosure. FIG. 5 shows the architecture of an eight-element receive antenna array. This antenna array is a hybrid beamformer composed of four sets of two-antenna analog beamforming implemented by autonomous beamformers and a set of four-stream digital beamformer implemented by a mechanism provided by the network node. The eight antennas may be configured to receive input signals. Each antenna is electrically coupled to an LNA for amplifying the input signal. The eight antenna elements are divided into four groups and the received input signals at the two antenna elements in a same group are combined by means of an autonomous beamformer.

In particular, a pair of antenna elements is electrically coupled to an autonomous beamformer. Within each autonomous beamformer, each LNA is electrically coupled to a phase shifter. The outputs of the two phase shifters are electrically coupled to a phase detector. The phase detector may be configured to detect the phase difference between the two input signals. Then, the phase detector may control the phase shifter to adjust the phase of each input signal. The phase difference between the two input signals may be compensated by the phase adjustment. For example, the phase difference between the two input signals may be 60 degree. The phase detector may control a first phase shifter to adjust a first input signal by −30 degree and control a second phase shifter to adjust a second input signal by +30 degree. Accordingly, the phase difference between the first input signal and the second input signal will be 0 degree after the phase adjustment. Then, the first input signal and the second input signal will be passed to an adder or a signal combiner. Since the phase difference is eliminated, the first input signal and the second input signal may be combined constructively.

The four set of autonomous beamformers are electrically coupled to the four-stream digital beamformer. Each stream of the digital beamformer may comprise a PA, a mixer, a filter and an analog-to-digital converter (ADC) for converting an input signal to a baseband digital signal. Then, the four base band digital signals will be passed to a baseband digital beamforming circuit for performing digital beamforming. In the digital beamforming, the phase and the amplitude of each stream will be further adjusted based on the reference signal from the network node. With the reference signal from the network node, the digital beamformer may be able to exclude the interference signals and amplify the data signals. Accordingly, the digital beamformer may combine the four stream input signals without interferences and phase differences.

With the autonomous beamformer shown in FIG. 5, the receiver can perform two-antenna analog beamforming autonomously without the support (e.g., reference signal) from the network node. The antenna array in FIG. 5 can determine the receive beamforming with a smaller number of OFDM symbols than the antenna array in FIG. 3 where there are no autonomous beamformers. Without autonomous beamformers, the network node generally needs to provide mechanisms to support analog beam alignment between the transmitter and the receiver. Specifically, the network node needs to provide a sufficient number of OFDM symbols for determining the receive beamformer of an antenna array. For example, two OFDM symbols may be required to determine the receive beamformer for a two-element antenna array as shown in FIG. 5. The network node also needs to provide the mechanism of transmission configuration indicator (TCI) for physical downlink shared channel (PDSCH), which informs the UE that the receive beamformer for the PDSCH is identical to the beamformer used for the reception of a known pilot signal (e.g., reference signal). Therefore, introducing the autonomous beamformer in the hybrid beamformer will significantly lower the needs and the overhead of reference signals/control signals from the network node, which releases the burden on network node and the radio resources. Accordingly, with the combination of autonomous beamformer and the digital beamformer, the hybrid beamformer can improve radio efficiency and maintain good signal quality/performance at the receiver.

Figure 6:
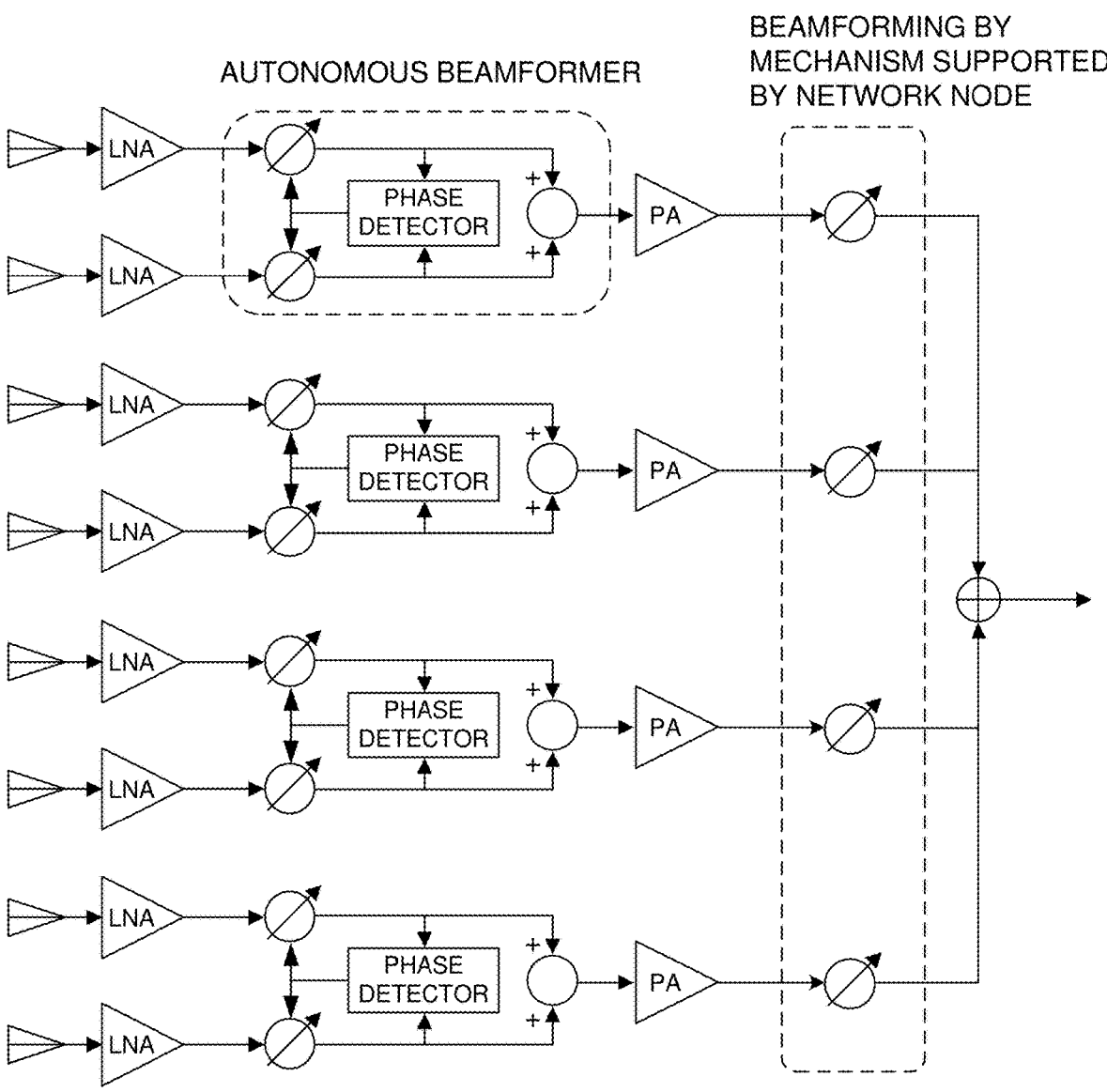
FIG. 6 illustrates one embodiment of hybrid beamforming with autonomous beamformers in accordance with embodiments of the present disclosure.

FIG. 6 illustrates another embodiment of hybrid beamforming with autonomous beamformers in accordance with embodiments of the present disclosure. FIG. 6 shows an analog beamformer composed of four sets of two-antenna analog beamforming implemented by autonomous beam-formers followed by a set of four-signal analog beamformer implemented by a mechanism provided by the betwork node. The operation principles of the autonomous beam-formers in FIG. 6 are similar to those in FIG. 5.

In particular, the four set of autonomous beamformers are electrically coupled to the four-stream analog beamformer for performing analog beamforming with the mechanism supported by the network node. Each stream of the analog beamformer may comprise a PA and a phase shifter. The four analog signals will be passed to an adder or a signal combiner for combination. In the analog beamforming, the phase of each stream will be further adjusted based on the reference signal from the network node. With the reference signal from the network node, the analog beamformer may be able to exclude the interference signals and amplify the data signals. Accordingly, the analog beamformer may combine the four stream input signals without interferences and phase differences.

With the autonomous beamformer, the receiver can perform two-antenna analog beamforming autonomously without the support (e.g., reference signal) from the network node. The antenna array in FIG. 6 can determine the receive beamforming with a smaller number of OFDM symbols than the antenna array in FIG. 3 where there are no autonomous beamformers. With the analog beamformer followed by the autonomous beamformer, the receiver can exclude the interference signals from the data signals and amplify the data signals according to the reference signal from the network node. The analog beamformer may combine the four stream input signals without interferences and phase differences. Therefore, introducing the autonomous beamformer in the hybrid beamformer will significantly lower the needs and the overhead of reference signals/control signals from the network node, which releases the burden on network node and the radio resources. Accordingly, with the combination of autonomous beamformer and the analog beamformer, the hybrid beamformer can improve radio efficiency and main-tain good signal quality/performance at the receiver.

FIG. 7 is a flow chart of a method of hybrid beamforming with autonomous beamformers in accordance with one novel aspect. In step 701, an apparatus receives a plurality of input signals from a network node by a plurality of antennas. In step 702, the apparatus performs autonomous beamforming by adjusting phases of the plurality of input signals to generate autonomous beamformed signals. In step 703, the apparatus performs at least one of digital beam-forming and analog beamforming on the autonomous beam-formed signals based on a reference signal from the network node to generate a beamformed signal.

In one implementation, the apparatus detects a phase difference between the plurality of input signals and com-pensates the phase difference.

In one implementation, the apparatus adjusts a first phase of a first input signal (e.g., increase/decrease the first phase by half of the phase difference) and adjusts a second phase of a second input signal (e.g., decrease/increase the second phase by half of the phase difference). The phase difference between the first phase and the second phase is zero after the compensating. The first input signal and the second input signal can be constructively combined after the autonomous beamforming.

In one implementation, the apparatus adjusts phases of the autonomous beamformed signals according to the reference signal from the network node and/or adjusts amplitudes of the autonomous beamformed signals according to the ref-erence signal from the network node when performing the digital beamforming.

In one implementation, the apparatus adjusts phases of the autonomous beamformed signals according to the reference signal from the network node when performing the analog beamforming.

Although the present invention has been described in connection with certain specific embodiments for instruc-tional purposes, the present invention is not limited thereto. Accordingly, various modifications, adaptations, and com-binations of various features of the described embodiments can be practiced without departing from the scope of the invention as set forth in the claims.

What is claimed is:

1. A method, comprising:
receiving, by an apparatus, a plurality of input signals from a network node by a plurality of antennas;
performing, by the apparatus, autonomous beamforming by adjusting phases of the plurality of input signals to generate autonomous beamformed signals; and
performing, by the apparatus, at least one of digital beamforming and analog beamforming on the autono-mous beamformed signals based on a reference signal from the network node to generate a beamformed signal, and wherein the analog beamforminq compris-ing adjusting, by the apparatus, phases of the autono-mous beamformed signals according to the reference signal from the network node.

2. The method of claim 1, wherein the autonomous beamforming further comprises:
detecting, by an apparatus, a phase difference between the plurality of input signals; and
compensating, by the apparatus, the phase difference.

3. The method of claim 2, wherein the compensating further comprises:
adjusting, by the apparatus, a first phase of a first input signal; and
adjusting, by the apparatus, a second phase of a second input signal,
wherein the phase difference between the first phase and the second phase is zero after the compensating.

4. The method of claim 3, wherein the first input signal and the second input signal are constructively combined after the autonomous beamforming.

5. The method of claim 1, wherein the digital beamform-ing further comprises:
adjusting, by the apparatus, phases of the autonomous beamformed signals according to the reference signal from the network node; and
adjusting, by the apparatus, amplitudes of the autonomous beamformed signals according to the reference signal from the network node.

6. The method of claim 1, wherein the autonomous beamforming is performed according to the plurality of input signals without using the reference signal from the network node.

7. The method of claim 1, wherein the at least one of digital beamforming and analog beamforming is performed after the autonomous beamforming.

8. The method of claim 1, wherein the autonomous beamforming is performed on each pair of the plurality of input signals.

9. The method of claim 1, wherein the at least one of digital beamforming and analog beamforming is performed on at least two of the autonomous beamformed signals.

9 10

10. An apparatus comprising:
a plurality of antennas that:
    receive a plurality of input signals from a network node;
an autonomous beamformer that:
    performs autonomous beamforming by adjusting phases of the plurality of input signals to generate autonomous beamformed signals; and
at least one of a digital beamformer and an analog beamformer that:
    performs at least one of digital beamforming and analog beamforming on the autonomous beamformed signals based on a reference signal from the network node to generate a beamformed signal, and wherein the analog beamforminq comprising adjusting, by the apparatus, phases of the autonomous beamformed signals according to the reference signal from the network node.

11. The apparatus of claim 10, wherein, in performing the autonomous beamforming, the autonomous beamformer further:
    detects a phase difference between the plurality of input signals; and
    compensates the phase difference.

12. The apparatus of claim 11, wherein, in compensating the phase difference, the autonomous beamformer further:
    adjusts a first phase of a first input signal; and
    adjusts a second phase of a second input signal, wherein the phase difference between the first phase and the second phase is zero after the compensating.

13. The apparatus of claim 12, wherein the first input signal and the second input signal are constructively combined after the autonomous beamforming.

14. The apparatus of claim 10, wherein, in performing the digital beamforming, the digital beamformer further:
    adjusts phases of the autonomous beamformed signals according to the reference signal from the network node; and
    adjusts amplitudes of the autonomous beamformed signals according to the reference signal from the network node.

15. The apparatus of claim 10, wherein the autonomous beamformer performs the autonomous beamforming according to the plurality of input signals without using the reference signal from the network node.

16. The apparatus of claim 10, wherein the at least one of digital beamforming and analog beamforming is performed after the autonomous beamforming.

17. The apparatus of claim 10, wherein the autonomous beamformer performs the autonomous beamforming on each pair of the plurality of input signals.

18. The apparatus of claim 10, wherein the at least one of digital beamformer and analog beamformer performs the at least one of digital beamforming and analog beamforming on at least two of the autonomous beamformed signals.

* * * * *